United States Patent [19]

Stalmach, Jr.

[11] 3,731,893
[45] May 8, 1973

[54] COOLING SYSTEM, EMPLOYING BAFFLING MEANS, FOR AN AERODYNAMICALLY HEATED VEHICLE

[75] Inventor: Charles J. Stalmach, Jr., Grand Prairie, Tex.

[73] Assignee: LTV Aerospace Corporation, Dallas, Tex.

[22] Filed: May 25, 1971

[21] Appl. No.: 146,702

[52] U.S. Cl. ............... 244/1 SS, 102/92.6, 102/105, 244/117 A
[51] Int. Cl. ........................ B64g 1/00, B64c 3/36
[58] Field of Search ............................. 244/1, 117 A; 102/92.6, 105

[56] References Cited

UNITED STATES PATENTS 3,026,806  3/1962  Runton et al. ................. 244/117 A
3,138,009  6/1964  McCreight ..................... 244/117 A Primary Examiner—Milton Buchler
Assistant Examiner—Jesus D. Sotelo
Attorney—James M. Cate and H. C. Goldwire

[57] ABSTRACT

A cooling system for an aerodynamically heated vehicle includes a chamber partially filled with a coolant and having front and rear portions. A baffling means, mounted within the front portion of the chamber, prevents forward passage of coolant from the chamber but is open to the rear to permit passage of coolant to the rear portion of the chamber. A conduit means is provided for conducting coolant from the rear portion of the chamber to the external surface of a portion of the outer skin of the vehicle which portion is subject to aerodynamic heating. During high-speed, decelerative, atmospheric flight of the vehicle, e.g., during reentry into the atmosphere of the earth, decelerative forces urge the coolant toward the forward portion of the chamber while aerodynamic heating of the vehicle causes vaporization of the coolant within the chamber. Vaporized coolant flows from the rear portion of the chamber, through the conduit means, to the external surface of the aerodynamically heated outer skin.

15 Claims, 7 Drawing Figures

PATENTED MAY 8 1973
3,731,893
SHEET 1 OF 2
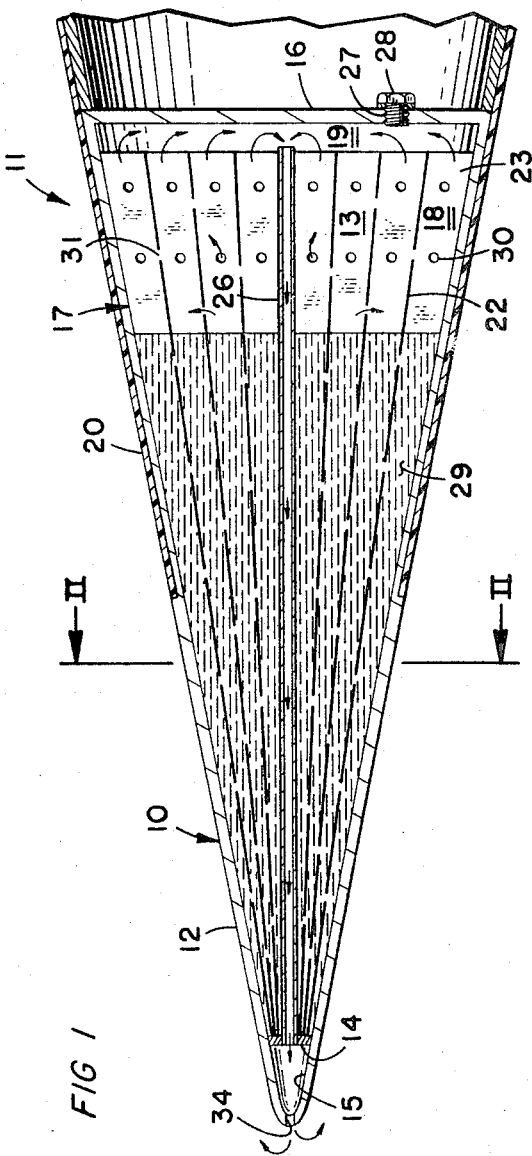
CHARLES J. STALMACH, JR.
INVENTOR
BY James M. Cato
ATTORNEY

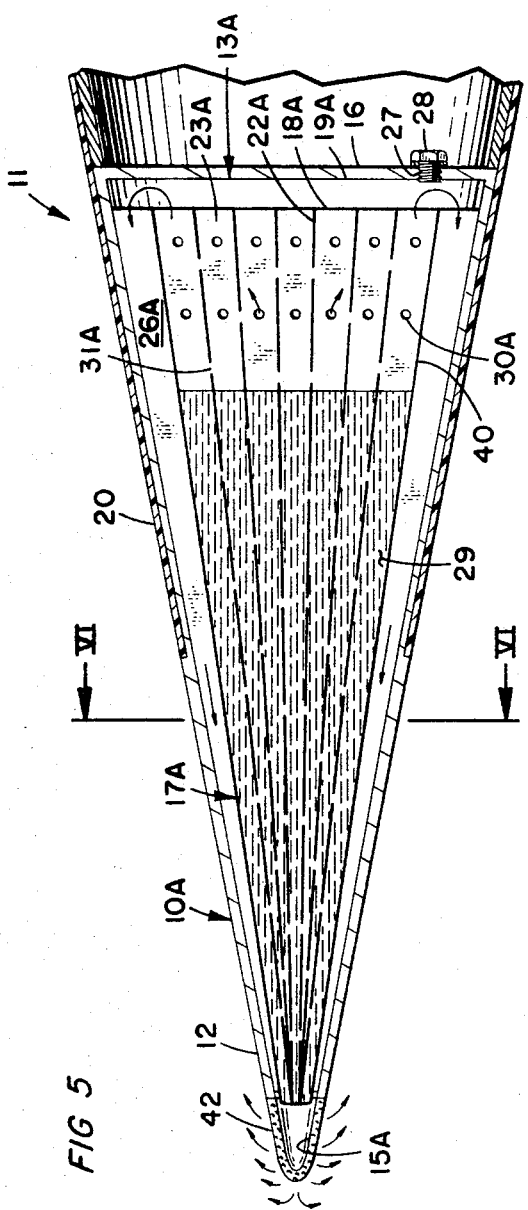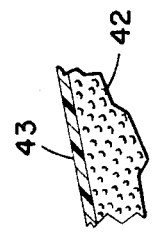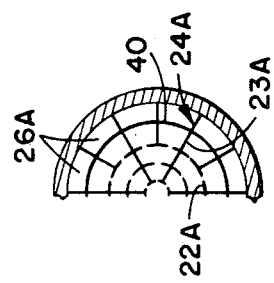

COOLING SYSTEM, EMPLOYING BAFFLING MEANS, FOR AN AERODYNAMICALLY HEATED VEHICLE

This invention relates to cooling systems for vehicles subject to aerodynamic heating during high-speed, atmospheric flight and, more particularly, to such cooling systems which are operable in response to aerodynamic heating.

In the design of high-speed aircraft and space vehicles, a major problem has been the difficulty of protecting such vehicles from damage or destruction from the effects of frictional and radiant, aerodynamic heating during hypervelocity flight through portions of the atmosphere of the earth or of other planets. This so-called "heat barrier" becomes an increasingly serious problem at velocities above Mach 4 or 5 and is a particular problem in the development of reusable space vehicles wherein it is desired to preserve the external portion of the vehicle during reentry heating to permit use of the vehicle in successive flights. It is, of course, desirable that deleterious thermal effects upon the outer skin and the structural members of space vehicles of all types be eliminated or minimized during reentry. For example, missiles which reenter the atmosphere at very high velocity and are decelerated by pressure and frictional resistance of the atmosphere often encounter severe aerodynamic heating of their forward nose sections. If such missiles are not protected from heat, their payloads may be prematurely destroyed during reentry. Additionally, thermal damage is of concern with respect to airplanes designed to fly in the atmosphere at speeds above Mach 3-5 for sustained periods of time, because the deleterious effects of aerodynamic heating may also occur as the temperatures of aircraft components build up over extended period during flight at velocities substantially lower than those of a vehicle reentering the atmosphere.

In the past, various solutions to the problem have been attempted. The one normally employed for the protection of a missile during reentry is the use of a heat shield which insulates the forward portion of the vehicle by partial ablation, re-radiation, and absorption. Such an approach is not preferable for usage in a vehicle which is to be refurbished and used for successive flights, however, because ablation or fusing of external portions of the craft will distort the external configuration of the vehicle. It would be very expensive to refurbish the ablated surfaces after each use during repetitive use. An approach which has been used during flights at lower velocities, or when severe heating is not encountered, is the circulation of a coolant through passageways adjacent the most severely heated portions of an aircraft or space craft such as the nose and the leading edges of wings or struts, the coolant acting to distribute the heat throughout the craft and thus cause it to be partially disbursed in heat-sink and heat-pipe fashion. Such systems are not satisfactory for flights at very high velocities, however when much greater cooling capacity is required for short periods of time. It is generally proposed to provide the necessary increased cooling capacity for such high velocity flights by the use of an evaporative coolant which is conducted into the airflow adjacent the external surfaces of severely heated portions of the vehicle. The coolant may advantageously be ejected by transpiration through a porous body of material contiguous with the external skin of the vehicle for providing uniform ejection of vaporized coolant for shielding the external surfaces from adjacent, super-heated, gaseous flow, as will be more fully described hereinbelow.

A relatively small amount of fluid coolant for affording a limited degree of evaporative cooling may be suspended immediately adjacent an external wall portion, e.g., within a structure containing a layer of coolant suspended adjacent to the wall portion. Or, a larger quantity of coolant may be contained in a chamber within the vehicle and ejected from the vehicle to heated portions of the external skin. Ejection of the coolant from such a chamber is accomplished through conduits opening through suitable orifices preferably formed through the skin of the vehicle forwardly of the respective, heated areas of the skin, or it may be accomplished by transpiration of coolant through a porous element contiguous with a respective heated area of the skin.

Prior-art systems of the type wherein a coolant stored in a tank within the vehicle is conducted to the external surface of heated portions of the vehicle have employed various types of sensors and control systems to activate pumps and other pressure sources for causing ejection of the coolant upon the occurrence of deleterious heating. Such control systems, pumps, meters, and the like add undesirable complexity and weight to the cooling system and are subject to possible malfunction or failure under stress. As an alternative, coolant contained aboard the vehicle may be ejected by pumps or other means actuated in accordance with a predetermined, sequential program dependent upon flight time. Such a method is not preferable for most applications, however, in that heating effects may not occur as predicted, and thus, the program may not correspond to actual conditions experienced by the vehicle. Furthermore, such a system again requires the use of fairly complex circuitry and control systems which, again, are subject to failure and malfunction.

It must be recognized that reliable operation of such cooling systems is of critical importance, particularly, of course, when passengers are to be transported in the vehicle. Failure or malfunction of a cooling system, e.g., during an abnormally fast reentry or during heat build-up over an extended period of time, could result in the occurrence of uncorrectable damage to vital elements of a craft and mean the loss of passengers and vehicle alike. Further, missiles employed for the delivery of military warheads and the like at high reentry velocities must be protected from aerodynamic heating if the payload is to be preserved during the flight. It is desirable, therefore, to minimize the complexity of such cooling systems and to eliminate components such as pumps, sensors, and hydraulic control systems, etc., which may be subject to malfunction under high-stress conditions. As space travel becomes more routine, it becomes increasingly desirable that spacecraft be capable of repeated usage rather than single flights only. To achieve this end, effective means for cooling a vehicle during reentry, which means may be replenished for repeated usage, is highly desirable.

It is, accordingly, a major object of the present invention to provide a new and improved cooling system for vehicles subject to aerodynamic heating.

Another object is to provide such a system which is operable in response to the rate of aerodynamic heating occurring at a given time.

A further object is to provide such a system which is powered exclusively by heat flux derived from aerodynamic heating of the vehicle.

Another major object is to provide such a heat-responsive cooling system of reliable and efficient operation which obviates the necessity of mechanical or electrical control systems, pumps, sensors, and the like.

Yet another object is to provide such a system which may be conveniently and inexpensively refurbished and filled with coolant following use.

Another object is to provide such a system which is of simple construction and of practicable and inexpensive manufacture.

Other objects and advantages will be apparent from the specification and claims and from the accompanying drawing illustrative of the invention.

In the drawing:

FIG. 1 is a longitudinal, sectional, somewhat diagrammatic view of a missile nose section employing a specific embodiment of the cooling system;

FIG. 2 is a cross-sectional view taken on the line II—II of FIG. 1;

FIG. 3 is a sectional, fragmentary view, on an enlarged scale, showing a portion of the nose section of FIG. 1 as it appears before ejection of coolant through the outlet;

FIG. 4 is a fragmentary view, similar to FIG. 3, showing diagrammatically a pressure relief valve associated with the outlet orifice;

FIG. 5 is a view, similar to FIG. 1 showing a modification of the cooling system employed in the nose section of a missile;

FIG. 6 is a cross-sectional view taken along the line VI—VI of FIG. 5; and

FIG. 7 is a fragmentary, sectional view, on an enlarged scale, of a portion of the porous structure of FIG. 5 and showing the external coating.

With initial reference to FIG. 1, a specific and generally preferred embodiment of the cooling system 10 is employed in a nose section 11 of a missile adapted to reenter the atmosphere of the earth at high velocity and which is thus subject to intense aerodynamic heating during reentry. The missile nose section 11 is of conical configuration and has an external skin 12 of a material, such as beryllium, chosen for its superior strength and durability when subjected to the high temperatures encountered during reentry. A substantially frustoconical chamber 13 is defined within the nose section 11, the aft end of the chamber 13 being defined by a circular, rear or aft bulkhead 16 which extends perpendicularly across the interior of the nose section 11 and is suitably welded (not shown) or otherwise sealingly affixed, continuously along its periphery, to the external skin 12. An annular, suitably planar, forward partition 14 is similarly affixed, along its periphery, to the inner surface of the skin 12 immediately forward of the chamber 13. The forward partition 14 constitutes the forward portion of a baffling means or baffle structure 17 which is an important portion of the present cooling system. The remainder of the baffle structure 17 is mounted within the chamber 13 in a forward portion 18 thereof, the rearmost portions of the baffle structure being spaced forwardly from the bulkhead 16 to define therebetween a manifold chamber 19, termed, herein, the chamber rear portion 19, aft of the baffle structure 17.

With added reference to FIG. 2, a preferred embodiment of the baffle structure 17 includes a plurality of frustoconical baffles 22 which are disposed in telescoped, concentric array and coaxially mounted within the forward portion 18 of the chamber 13. The frustoconical baffles 22 are suitably of progressively greater angular divergence from the innermost to the outermost, as illustrated. A plurality of planar baffles 23 extend radially between adjacent ones of the frustoconical baffles 22 at angularly spaced intervals, as shown most clearly in FIG. 2, and extend longitudinally for the length of the chamber forward portion 18. The planar baffles 23 are suitably welded or otherwise rigidly connected between and to respective, mutually adjacent ones of the frustoconical baffles 22 for rigidly supporting the frustoconical baffles in concentric array. At least some of the planar baffles 23 are disposed in mutual, angular alignment within several planes intersecting the longitudinal axis of the nose section 11 and extending radially through the frustoconical baffles 22 at angularly spaced intervals. These mutually aligned, planar baffles 23 define planar, radially extending baffle structures 24 comprising adjacent baffles 23 disposed edge-to-edge, the baffles 23 of each radial structure 24 extending contiguously from the external skin 12 and inwardly within the chamber 13 to a central conduit 26, to be described. The radial baffle structures 24 thus serve to conduct heat from the outer skin 12, during aerodynamic heating thereof, inwardly throughout the chamber 13 for dissipating the heat throughout a coolant 29 contained within the chamber 13 and also to be described. The conduit 26 extends coaxially through the baffle structures 17 and is supportingly connected to the innermost ones of the planar baffles 23. The conduit 26 is sealingly fitted within a corresponding bore formed coaxially through the forward partition 14 and communicates between the forward chamber 15 and the rear portion 19 of the chamber 13.

As illustrated in FIG. 1, the chamber 13 is partially filled with a coolant 29, the coolant 29 having been partially exhausted by operation of the system 10 during reentry of the associated vehicle. The coolant 29 is a material having good heat conduction and high latent heat of vaporization and necessarily has a range of vaporization temperatures below that at which deleterious heating of the outer skin 12 occurs. Distilled water is a preferred and inexpensive coolant having a latent heat of vaporization of 539.44 gram-calories/gram. In addition to liquid coolants such as water, certain normally solid materials are also suitable, provided that they have a range of vaporization temperatures below the temperature at which operation of the cooling system 10 is desired, i.e., below that at which deleterious heating of the outer skin 12 occurs. For example, polytetrafluoroethylene has a vaporization temperature of 867° K. and a heat of vaporization of 378 gram-calories/gram at atmospheric pressure and thus can be utilized when operation of the system is not necessary at temperatures lower than 867° K.

With respect to the preferred embodiment of FIGS. 1 and 2, a normally liquid coolant 29, preferably distilled water, partially fills the chamber 13. During furbishing of the cooling system 10 prior to use, sufficient coolant is introduced into the chamber 13 to substantially fill the chamber forward portion 18. An inlet 27 is suitably provided through the rear bulkhead 16 for permitting filling of the chamber 13 with coolant 29. [Alternatively, provision (not shown) is made for injecting the coolant through the outlet 34, to be described.] A plug 28 fits within and is threadingly engaged with the inlet, the plug 28 having an external shoulder which suitably seats upon a gasket of a ductile metal such as aluminum for ensuring sealing of the inlet 27 during aerodynamic heating of the vehicle. The coolant 29, as illustrated, is caused to flow in a relatively forward direction within the chamber 13 because of its inertia as the nose section 11 is rapidly decelerated, and the coolant is constrained within the forward portion 18 of the chamber 13 by the deceleration of the nose section 11 but restrained by the baffle structure 17. The baffles 22 and 23 are open to the rear for permitting rearward passage of coolant 29 to the chamber rear portion 19. The baffle structure 17 thus constitutes a means for preventing forward passage of coolant 29 from the chamber 13 but for permitting rearward passage of coolant from the front portion 18 to the rear portion 19 of the chamber 13.

A plurality of first orifices 30 are formed through the planar baffles 23 and are mutually spaced along the lengths of the respective planar baffles. Similarly, a plurality of second orifices 31 are formed through the frustoconical baffles 22 and are mutually spaced along the lengths of the frustoconical baffles between each mutually adjacent pair of planar baffles 23. For clarity, the orifices 30, 31 are shown diagrammatically as gaps in the baffles 22, 23 in cross-sectional views because of the limited scale. The first and second orifices 30, 31 permit limited circulation of the coolant 29 throughout the baffle structure 17, and the second orifices 31 (through the frustoconical baffles 22) permit passage of coolant from within the chamber forward portion 18 outwardly toward and into contact with the outer skin 12 of the nose section 11. Coolant 29 is thus free to circulate within the chamber forward portion 18 through the orifices 30, 31 and to the rear chamber portion 19; from the rear portion 19 it may pass forwardly through the conduit 26 to the forward chamber 15.

An outlet 34 is formed coaxially of the nose section 11 through the forward portion of the skin 12, the outlet 34, forward chamber 15, and conduit 26 comprising means for conducting coolant 29 from the chamber rear portion 19, through the baffle structure 17, and to the external surface of the skin 12. The outlet 34 communicates with the external surface of the skin 12 at the forward portion of the skin, which portion is subject to the most intense and potentially deleterious aerodynamic heating. This "conduit means" also includes a means for normally preventing passage of coolant 29 from the chamber 13 to the external surface of the skin 12 but for permitting passage of coolant upon the occurrence of aerodynamic heating of the skin 12 above a predetermined level. That is, coolant 29 is prevented from escape through the outlet 34 during storage of the nose section 11 and during flights in which severe deleterious heating of the skin 12 does not occur. Such a means for normally preventing fluid flow through the outlet 34 is suitably a plug 35 (FIG. 3), sealingly fitted within the outlet 34, formed of a material having a melting point below the predetermined level at which operation of the cooling system 10 is desired, and adapted to melt before deleterious heating of the external skin 12 occurs. An alternate construction for normally preventing fluid flow through the outlet 34, shown diagrammatically in FIG. 4, comprises a pressure-relief valve 36 which is operable to prevent passage of fluid outwardly through the outlet 34 until pressure within the forward chamber 15 exceeds a predetermined, critical level during aerodynamic heating, as will be more fully discussed. Alternatively, a diaphragm (not shown) is installed in series with the outlet 34 for preventing passage of coolant through the outlet 34 until pressure within the forward chamber 15 is raised above a predetermined level that causes the diaphragm to burst.

In the present, exemplary embodiment, an additional, ablative layer 20 is bonded to the external surface of the skin 12 within a circumferential, indented portion of the skin which indented portion extends rearwardly from a plane perpendicular to the longitudinal axis of the nose section 11 and intersecting the approximate longitudinal center of the chamber 13. The ablative, outer layer 20 is of a material such as nylon phenolic heat shield material and is employed for providing additional protection from aerodynamic heating for portions of the outer skin 12 which are spaced a distance rearwardly of the forward tip of the nose section 11. The forward portion of the external skin 12, i.e., the portion forward of the ablative material 20, is the portion which is subject to the most intense and potentially deleterious aerodynamic heating. The ablative layer 20 provides additional, conventional, ablative and shielding protection for rearward portions of the vehicle, the forward portion being cooled effectively, as will be described, by the present cooling system 10. The chamber 13 preferably is at least partially defined by the intensely heated portion of the skin 12 forward of the ablative layer 20 for permitting efficient conduction of heat from the skin 11 to the coolant 29.

While the dimensional relationships of the construction of the system 10 depend upon the particular mission and vehicle in which the system is used, an exemplary embodiment employs a chamber 13 having a volume of approximately 110 percent of the initial coolant volume, an outlet orifice 34 of approximately 0.1 inches in diameter, and an external skin of an average thickness of about 1.0 in, and a coolant volume of about 350 cu.in.

The operation of the cooling system 10 is as follows. The relief valve 36 (FIG. 4) or alternatively, the plug 35 (FIG. 3), prevents passage of coolant 29 through the outlet 34 normally (i.e., during storage of the nose section 11 and during flight of the vehicle at speeds below those at which significant aerodynamic heating occurs). During acceleration and deceleration of the nose section 11, the baffle structure 17 serves to prevent severe periodic movement or "sloshing" of liquid coolant 29 within the chamber 13, such liquid movement being a potential cause of instability for the associated vehicle.

During decelerative flight through an atmosphere, e.g., during reentry of the craft into the atmosphere of the earth, greatly increased air pressures occur adjacent the leading portions of the vehicle, and stagnational and frictional reaction of the adjacent airflow with the nose section 11 causes intense aerodynamic heating of the forward portion of the nose section 11. The temperature of the skin 12 adjacent the forward portion 18 of the chamber 13 increases, and substantial heat flux is conducted from the skin to the coolant 29 adjacent the skin. Additionally, heat is conducted, through the radially extending baffle structures 24 and, secondarily, the frustoconical baffles 22, within and throughout the chamber 13 and the enclosed coolant 29. Because of the rapid deceleration of the nose section 11 during reentry, the inertia of the coolant 29 causes it to be forcefully urged, in a forward direction relative to the nose cone 11, against the closed, forward end of the baffle structure 17 and thus contained within the forward portion 18 of the chamber 13. At this stage, the cooling system 10 serves as a heat-sink to prevent localized thermal damage to the skin 12 by distributing heat flux throughout the chamber 13. Such missile nose sections 11 are normally caused to develop a degree of spin about their longitudinal axes, and during such spinning movement the coolant 29 is urged radially outwardly through the second orifices 31 and against the heated, external skin 12. As reentry heating intensifies, the temperature of the coolant 29 is increased and some of the coolant adjacent to skin 12 is brought to vaporization temperature, increasing the pressure within the chamber 13. Vaporized coolant 29 is prevented, by the baffle structure 17 and by the concentration of liquid (or solid) coolant 29 in a forward portion of the chamber 13, from flowing in a forward direction, but is free to flow in a rearward direction into the rear portion 19 of the chamber 13. As the pressure within the chamber rear portion 19 is increased, vaporized coolant flows forwardly through the conduit 26 and into the forward chamber 15. The tip of the nose section 11 adjacent the outlet 34 is also heated, until the melting point of the plug 35 (FIG. 3) is reached, at which time the pressure within the forward chamber 15 is sufficient to expel the partially melted plug 35 and to allow ejection of vaporized coolant forwardly through the outlet 34. The coolant 29 dispersed forwardly through the outlet 34 is then swept rearwardly over the nose section 11, by the adjacent airflow, in the direction represented by the arrows of FIG. 1 adjacent the outlet 34, producing a layer of air and vaporized coolant adjacent the skin 12 which acts to cool the skin by convection and to shield it from very hot gasses which are produced by radiant and frictional reaction of the forward portion of the nose section 11 with the adjacent, hypervelocity air flow. The operation of the pressure relief valve 36 (FIG. 4) is analogous to that of the outlet plug 35. As heat is received by the nose section 11, vapor pressure within the chamber 13 and the forward chamber 15 increases until a predetermined pressure level is reached, at which time the pressure relief valve 36 is unseated to permit passage of vapor forwardly through the outlet 34. The predetermined level of pressure (and the predetermined fusing temperature of the plug 35) is below, by an appropriate safety margin, the level encountered when thermal damage to the nose section 11 occurs. For example, the melting point of the plug 35 may be of the order of 800°–1000° F. if the material of the outer skin 12 has a melting point of approximately 2300° F. as in the case of beryllium. The pressure relief valve 36 is preferred, over the plug 35, because it can be adjusted, by proper selection of the relief pressure at which it opens, to regulate the passage of coolant 29 through the outlet 34 as required, the valve 36 being operable to reduce the outward passage of coolant 29 or to close and stop passage of coolant should the cooling action of the system 10 reduce the temperature of the nose section 11 to a safe level. In contrast, the plug 35 of FIG. 3 is lost upon its ejection, and coolant is continuously released through outlet 34 thereafter. In one embodiment, for example, relief pressure of approximately 700 p.s.i. is preferred.

The cooling system 10 thus utilizes the coolant 29 first as a heat-sink to absorb and disperse heat throughout the nose section 11, secondly as an evaporative cooling means due to the latent heat of vaporization of the coolant as it is vaporized within the chamber 13, and thirdly as a vapor layer surrounding the skin 12 which layer protects the nose section 11 by blockage of super-heated gasses surrounding the nose section 11. Wasteful expenditure of coolant 29 by its ejection in liquid form through the outlet 34 is avoided by the rearwardly open baffle structure 17. That is, the baffle structure 17 is effective to prevent a sudden and wasteful ejection of coolant forwardly through the outlet 34 as a result of severe decelerative forces occurring during reentry, but to permit a more gradual flow of vaporized coolant rearwardly, and subsequently forwardly through the conduit 26, in response to heating of the nose section 11 and resulting vaporization of the coolant 29.

The cooling system 10 thus provides a means for cooling the external surface of the nose cone 11 at a rate directly responsive to the degree of aerodynamic heating thereof, for evaporation and ejection of the coolant are induced directly by the heat flux received by the nose section 11. Yet the system is not of increased complexity when compared to prior-art systems but, in fact, is of relatively simple, practicable manufacture requiring few if any moving parts.

Having described a cooling system 10 employing particular, preferred embodiments of the baffle structure 17 and conduit 26 (which essentially comprise, respectively, baffling means for permitting only rearward passage of coolant from the front portion of the chamber 18, and conduit means for conducting coolant from the rear portion 19 to the external surface of the forward portion of the skin 12), it is to be understood that the illustrative embodiment is exemplary only and is not to be construed as limiting the scope of the claims to a particular configuration. Various other configurations of the baffle structure 17 and conduit 26 are possible, provided they permit the above-described circulation of vaporized coolant to the rear of the chamber 13 and then to the heated area of the skin 12. For example, a modification 10A of the cooling system is illustrated in FIGS. 5 and 6 of the drawing. The modified cooling system 10A is similar to the first, preferred embodiment, in that a missile nose section 11 of conical configuration and with an external skin 12 contains a substantially frustoconical chamber 13A defined within the nose section 11 and having an aft end defined by a circular, rear or aft bulkhead 16 extending across the nose section 11 perpendicularly of the longitudinal axis of the nose section. A baffling means, baffle structure 17A, is mounted within the chamber 13A in a forward portion 18A thereof, the rear of the baffle structure 17A being spaced forwardly from the bulkhead 16 to define therebetween a manifold chamber 19A aft of the baffle structure 17A and termed herein the rear portion 19A of the chamber 13A. The baffle structure 17A includes a plurality of frustoconical baffles 22A which are disposed in telescoped, concentric array and coaxially mounted within the forward portion 18A of the chamber 13A. A plurality of planar, radially extending baffles 23A are connected between adjacent ones of the frustoconical baffles 22A as is most clearly seen in FIG. 6 and, as in the first embodiment, serve to rigidly support the frustoconical baffles 22A in concentric array. Again, at least some of the planar baffles 23A are disposed within several, common planes, which extend radially through the frustoconical baffles 22A at angularly spaced intervals, for permitting improved conduction of heat from the external skin 12 of the nose section 11 within the chamber 13A. Respective pluralities of first orifices 30A and second orifices 31A are formed through the planar baffles 23A and the frustoconical baffles 22A, respectively, for providing limited circulation of coolant within the baffle structure 17A.

In contrast to the embodiment of FIGS. 1 and 2, the modification of FIGS. 5 and 6 does not employ a central, coaxially mounted conduit 26 (FIG. 1) for conducting coolant forwardly through the baffle structure 17A. Rather, the baffle structure 17A includes an outermost, impervious, substantially frustoconical baffle 40 which is spaced within the inner surface of the external skin 12, leaving open passageways 26A between the outermost baffle 40 and the skin 12 which passageways extend along the length of the baffle 40 from the rear chamber portion 19A to the forward chamber 15A (and between adjacent ones of the planar baffles 23A which extend between the skin 12 and the outermost baffle 40). The impervious, outer baffle 40 thus serves to prevent forward passage of liquid coolant 29 from the chamber forward portion 18A, the baffle structure 17A being open to the rear to permit rearward passage of vaporized coolant to the rear portion 19A and from there forwardly through the peripheral passageways 26A surrounding the impervious, outer baffle 40. The outer baffle 40 replaces the forward partition 14 (FIG. 1) to prevent forward passage of substantial quantities of liquid coolant.

The modified baffle structure 17A is adapted for use in missiles or the like wherein less immediate response to aerodynamic heating is required, for the coolant 29 is spaced inwardly from the outermost skin 12 by the passageways 26a and is somewhat insulated therefrom. Thus, heating of the coolant 17 may be somewhat more gradual during reentry, and evaporation of the coolant may extend over a somewhat longer period of time. However, the planar, radially extending structures 24A formed by the mutually aligned, planar baffles 23A are employed to conduct heat flux from the skin 12 inwardly within and throughout the coolant 29.

To illustrate an alternate means for ejecting coolant forwardly of the nose section 11, a porous structure 42 of approximately conical configuration replaces a forward portion of the nose section 11 adjacent and enclosing the forward chamber 15A. The porous structure 42 is welded or otherwise rigidly affixed to the forward end of the outer skin 12 of the nose section 11 and, extending contigously of the skin 12, defines the forward tip of the nose section 11. The material of the porous structure 42 is one which is not easily deformed at the high temperatures encountered during reentry, and suitable materials include carbon derivatives, boron, or stainless steel. A preferred process for the manufacture of such porous structures which is commonly employed in the art is the sintering of particles of a material, such as stainless steel or carbon, together under high temperatures or pressures. The porous structure 42 is of a porosity which is sufficient to permit passage therethrough of vaporized coolant from the rear chamber portion 19A, but insufficient to permit passage of any substantial amounts of liquid coolant 29. The porous structure 42 may alternately encompass all of forward chamber 15A (not shown), if it is of sufficient porosity, as an alternative to the hollow construction shown. When certain dissimilar metals are used in the construction of the porous structure 42 and the skin 12 it may be desirable to provide further reinforcement of the juncture between the porous structure 42 and the remainder of the nose section 11, such as by affixing the porous structure 42 to the nose section 11 by bolts or other fastening means or by threading attachment of the porous structure to the remainder of the nose section 11. An alternative method of construction of the porous structure 42 is to employ a plurality of fine screens formed of filaments of high-fusing-point materials such as boron or stainless steel, the screens being pressed and bonded or fused together, one upon the other, to provide a desired thickness and porosity. The pores of the porous structure 42 thus provide an outlet which is analogous to the outlet 34 of the first embodiment (FIG. 1). The porous structure 42 and the passageways 26A comprise a means for conducting coolant 29 to the external surface of the skin from the rear portion 19A of the chamber 13A by transpiration of the coolant through a body of porous material.

The porosity of the porous structure 42 is determined by the size, and by the amount of size variation, of the particles of material employed in its construction. The porosity should be sufficient to permit seepage through the porous structure 42 of only a small amount of coolant 29 in liquid form, but to permit substantial passage therethrough of coolant upon its being converted to a vaporized state during aerodynamic heating of the nose section 11.

With added reference to FIG. 7, means for normally or initially preventing passage of the coolant 29 from the chamber 13A to the external surface of the porous structure 42 and of the skin 12 suitably comprise a coating 43 deposited over the external surface of the porous structure 42. The coating 43 is of a material having a melting point below that at which operation of the cooling system 10A is desired. Solder is a suitable material, as is epoxy resin. (The coating 43 is shown in greatly enlarged scale in FIG. 7, and cannot be conveniently illustrated in FIG. 5.) The coating 43 seals the external surface of the porous structure 42 and serves to prevent seepage or evaporation of the coolant 29 during storage of the nose section 11, but is of a sufficiently low melting point to ensure melting of the sealant during heating of the nose section 11 above the predetermined temperature at which operation of the cooling system 10A is desired. Alternatively, a diaphragm or pressure-relief valve may be installed in series between the porous structure 42 and the passageways 26A for permitting forward passage of coolant 29 upon pressure within the chamber 13A being raised above a predetermined level during aerodynamic heating of the nose section 11, as in the embodiment described above with reference to FIGS. 1 and 4.

Operation of the modified embodiment of FIGS. 5–7 is similar to that of the previously described embodiments. Initially, the protective coating 43 prevents passage of coolant through the porous structure 42 during storage of the nose section 11 and during initial flight of the vehicle at speeds below those at which significant aerodynamic heating occurs. During reentry of the vehicle into the atmosphere, greatly increased air pressures occur adjacent the leading portions of the craft, and stagnational and frictional reaction of the airflow with the nose section 11 causes aerodynamic heating of the forward portions of the craft as in the embodiment previously described. As the temperature of the nose section 11 increases, the temperatures of the skin 12 and of the porous structure 42 also increase, and substantial heat flux is conducted from the heated exterior portions to the chamber 13A and the enclosed coolant 29 through the baffle structure 17A. The liquid coolant 29 is urged forwardly, relative to the nose section 11, and in response to the inertia reaction to deceleration of the nose section 11, within the outer, impervious baffle 40 of the forward chamber portion 18A and is prevented by the baffle 40 from escaping forwardly therefrom into the forward chamber 15A. As heating of the nose section 11 continues, some coolant 29 reaches vaporization temperature, and vaporized coolant flows rearwardly into the rear chamber portion 19A and forwardly therefrom through the peripheral passageways 26A between the skin 12 and the outer baffle 40. Upon the temperature of the coating 43 reaching the melting point, the coating melts and is dispersed by the airflow adjacent the nose section 11, permitting passage of vaporized coolant through the porous structure 42 by transpiration. The temperature reached by the porous structure 42 during operation of the cooling system 10A is sufficient to vaporize substantially all liquid coolant 29 upon contact or during passage of the coolant through the porous body 42, should any coolant be conducted through the passageways 26A in liquid form during flight of the vehicle and before the coolant is urged forwardly within the outer baffle 40 by the decelerative forces of reentry. When, for example, water is used as the coolant 29, vaporization of the water within the chamber 13A as well as within the passageways 26A and within the pores of the porous structure 42 provides substantial cooling of the nose section 11 because of the relatively high latent heat of vaporization of water. The porous structure 42 thus provides advantages over the single outlet 34 (FIG. 1) in that the coolant 29 is dispersed evenly throughout a relatively large portion of the tip of the nose section 11 and provides cooling of the nose tip by evaporation and expansion of the coolant within the porous material of the structure 42. Additionally, vapor is distributed around the porous structure 42 and passes rearwardly over the remainder of the outer skin 12 to effect cooling by blockage of the super-heated gasses surrounding the nose section 11, as in the first embodiment.

During reentry, the baffle structure 17A serves to attenuate any undesired, periodic movement or "sloshing" of the coolant within the chamber 13A which may tend to affect the stability of the vehicle during flight. As in the first embodiment, coolant which is suddenly urged in a relative forward direction within the vehicle by inertial forces during reentry is prevented from being ejected too quickly, but rather is retained to first absorb a substantial quantity of heat until it is changed to a vaporous state; it is then circulated through the rear chamber portion 19A and the conduits 26A at a relatively uniform rate. Thus, the ejection of coolant is extended over a longer period of time, by its containment within the baffle structure 17A until vaporization is achieved, and provides increased thermal protection for the vehicle as compared to prior evaporative cooling systems for such vehicles.

While the cooling system has been thus far described with reference to its application within the nose section of a spacecraft, its use is not limited thereto. For example, coolant chambers having such rearwardly open baffle structures are also suitably provided within leading portions of the wings of aircraft or air/space shuttle vehicles, such cooling systems (not shown) having analogous passages extending from rear portions of the respective chambers to heat-susceptible, leading edge portions of the wings for providing cooling thereof as in the above-described embodiments.

With respect to each of the above-described modifications, it is evident that the cooling system provides operation in direct response to the rate of aerodynamic heating occurring at a given time and thus minimizes any waste of coolant before operation is required. Operation of the system requires no expenditure of power from the on-board, spacecraft power sources. While these and other advantageous results are thus obtained, the system is not of increased complexity when compared with prior-art devices, but rather is of straightforward, relatively simple construction which completely eliminates the necessity of pumps, sensors, timing mechanisms, electrical circuits and the like which have been used in analogous, prior devices. Reliability of operation is thus improved by the elimination of the possibility of malfunction of such mechanisms.

While only one embodiment of the invention, together with modifications thereof, have been described in detail herein and shown in the accompanying drawing, it will be evident that various further modifications are possible in the arrangement and construction of its components without departing from the scope of the invention.

What is claimed is:

1. Apparatus for cooling a vehicle during high-speed, decelerative, atmospheric flight, the vehicle having an external skin at least a portion of which is subject to deleterious, aerodynamic heating, the apparatus comprising:
  a chamber defined within the vehicle adjacent a portion of the skin which portion is subject to deleterious, aerodynamic heating, the chamber having a forward portion and a rear portion spaced rearwardly in the vehicle from the forward portion;
  a coolant at least partially filling the chamber and having a range of vaporization temperatures below the temperature at which deleterious heating of the skin occurs;
  baffling means, mounted at least partially within the forward portion of the chamber, for preventing forward passage of coolant from the chamber through the baffling means, the baffling means being open to the rear for permitting rearward passage of coolant from the forward portion to the rear portion of the chamber; and
  conduit means for conducting coolant from the rear portion of the chamber to the external surface of the portion of the skin subject to deleterious, aerodynamic heating.

2. The apparatus of claim 1, wherein the conduit means comprises a means for conducting coolant from the rear portion of the chamber, through the baffling means, and to the external surface of the skin.

3. The apparatus of claim 1, wherein the baffling means includes an external, imperforate baffle spaced within and adjacent to the skin of the vehicle, and wherein the conduit means comprises a passageway extending between the imperforate baffle and the skin.

4. The apparatus of claim 1, wherein the baffling means includes baffle structures in contact with the skin and extending inwardly within the chamber for conducting heat from the skin to the coolant within the chamber.

5. The apparatus of claim 1, wherein the conduit means includes an outlet communicating through the skin, the apparatus further comprising:
  means for normally preventing passage of coolant from the chamber to the external surface of the skin and for permitting passage of coolant to the external surface upon the occurrence of aerodynamic heating of at least a portion of the apparatus above a predetermined level.

6. The apparatus of claim 1, wherein the chamber is at least partially defined by the inner surface of the portion of the skin subject to deleterious aerodynamic heating.

7. The apparatus of claim 1, wherein the conduit means includes an outlet communicating through the skin, the apparatus further comprising:
  valve means for normally preventing passage of coolant to the external surface of the skin and for permitting passage of coolant to the external surface upon the occurrence of pressure, above a predetermined level, within the conduit means.

8. The apparatus of claim 1, wherein the conduit means includes a means for conducting coolant to the external surface of the skin by transpiration of the coolant through a body of porous material.

9. The apparatus of claim 8, wherein the body of porous material has an external surface contiguous with the external surface of the skin, and wherein the means for normally preventing passage of coolant from the chamber to the external surface of the skin and for permitting passage of the coolant upon the occurrence of aerodynamic heating of the skin above a predetermined level comprises a coating normally sealing the external surface of the body of porous material, the coating being of a material having a melting point below the preselected temperature.

10. The apparatus of claim 8, wherein the vehicle constitutes a spacecraft having a forward nose section, the body of porous material constituting the forward portion of the nose section, whereby coolant ejected through the body of porous material is carried rearwardly over the external surface of the spacecraft by airflow adjacent the nose section for cooling the spacecraft.

11. Apparatus for cooling a spacecraft during high-speed, decelerative, atmospheric flight, the spacecraft having a nose section having an external skin at least a portion of which is subject to deleterious aerodynamic heating, the apparatus comprising:
  a chamber defined within the nose section of the spacecraft adjacent a portion of the skin subject to deleterious, aerodynamic heating, the chamber having a forward portion and a rear portion spaced rearwardly in the nose section from the forward portion,
  a coolant at least partially filling the chamber;
  baffling means, mounted at least partially within the forward portion of the chamber, for preventing forward passage of coolant from the chamber through the baffling means, the baffling means being open to the rear to permit passage of coolant from the forward portion to the rear portion of the chamber; and
  conduit means for conducting coolant from the rear portion of the chamber to the external surface of the portion of the skin, adjacent the chamber, subject to deleterious, aerodynamic heating.

12. The apparatus of claim 11, wherein the baffling means includes a plurality of baffles of frustoconical configuration, the baffles being disposed coaxially within the nose section in mutually concentric array and diverging toward the rear of the nose section, the forward ends of the baffles being mutually joined in sealing association, the conduit means comprising a conduit passing from the rear portion of the chamber and forwardly through the plurality of baffles.

13. The apparatus of claim 12, the baffling means further comprising a means for conducting coolant from the forward portion of the chamber radially outwardly through the baffling means to the inner surface of the external skin of the vehicle.

14. The apparatus of claim 11, wherein the baffling means comprises a plurality of baffles of substantially frustoconical configuration, the baffles being disposed coaxially within the nose section in mutually concentric array and diverging toward the rear of the nose section.

15. The apparatus of claim 14, wherein the outermost baffle comprises an imperforate baffle spaced within and adjacent to the skin of the nose section of the vehicle and wherein the conduit means comprises at least one passageway defined between the skin and the outermost baffle.

* * * * *